(12) United States Patent
Itakura (10) Patent No.: US 8,238,088 B2
(45) Date of Patent: Aug. 7, 2012

(54) ELECTRONIC APPARATUS

(75) Inventor: Hiroaki Itakura, Ome (JP)

(73) Assignee: Kabushiki Kaisha Toshiba (JP)

( * ) Notice: Subject to any disclaimer, the term of this patent is extended or adjusted under 35 U.S.C. 154(b) by 97 days.

(21) Appl. No.: 12/916,260

(22) Filed: Oct. 29, 2010

(65) Prior Publication Data

US 2011/0157807 A1   Jun. 30, 2011

(30) Foreign Application Priority Data

Dec. 25, 2009   (JP) .................................. 2009-296141

(51) Int. Cl.
*H05K 5/00* (2006.01)
*H05K 7/00* (2006.01)

(52) U.S. Cl. ......... 361/679.27; 361/679.26; 361/679.21; 361/679.55

(58) Field of Classification Search ............. 361/679.27, 361/679.26, 679.28, 679.21, 679.55
See application file for complete search history.

(56) References Cited

U.S. PATENT DOCUMENTS

| | | | |
|---|---|---|---|
| 5,715,139 A | 2/1998 | Nakajima | |
| 5,808,861 A | 9/1998 | Nakajima et al. | |
| 6,091,601 A * | 7/2000 | Schlesener et al. | 361/679.28 |
| 6,170,120 B1 * | 1/2001 | Lu | 16/342 |
| 7,106,579 B2 * | 9/2006 | Maskatia et al. | 361/679.28 |
| 7,124,473 B2 * | 10/2006 | Lu et al. | 16/342 |
| 7,426,114 B2 | 9/2008 | Nakatani et al. | |
| 7,607,202 B1 * | 10/2009 | Lee | 16/342 |
| 7,664,176 B2 * | 2/2010 | Bao et al. | 375/240.08 |
| 2008/0239641 A1 | 10/2008 | Sato et al. | |
| 2008/0285218 A1 | 11/2008 | Iijima | |
| 2010/0067205 A1 | 3/2010 | Tanaka | |

FOREIGN PATENT DOCUMENTS

| | | |
|---|---|---|
| JP | 07-084673 A | 3/1995 |
| JP | 08-129434 A | 5/1996 |
| JP | 09-081271 A | 3/1997 |
| JP | 2001-332881 A | 11/2001 |
| JP | 2002-132174 A | 5/2002 |
| JP | 2003-87378 A | 3/2003 |
| JP | 2003-337638 A | 11/2003 |
| JP | 2005-217297 A | 8/2005 |
| JP | 2007-188311 A | 7/2007 |
| JP | 2008-250831 A | 10/2008 |
| JP | 2009-294862 A | 12/2009 |
| JP | 2010-067193 A | 3/2010 |
| WO | WO 2007/086117 A1 | 8/2007 |

OTHER PUBLICATIONS

Notice of Reasons for Rejection mailed by Japan Patent Office on Dec. 14, 2010 in the corresponding Japanese patent application No. 2009-296141.

Notice of Reasons for Rejection mailed by Japan Patent Office on Jul. 19, 2011 in a corresponding Japanese patent application No. JP 2011-084477, which is a divisional of JP 2009-296141.

* cited by examiner

*Primary Examiner* — Anthony Haughton (74) *Attorney, Agent, or Firm* — Knobbe, Martens, Olson & Bear LLP (57) ABSTRACT

According to one embodiment, an electronic apparatus includes a main housing, a keyboard attached to the main housing, a hinge attached to a display housing, and a reinforcing member in the main housing. The reinforcing member includes a fixing portion to which the hinge is attached and a supporting portion including a surface facing the keyboard. The keyboard is placed on the supporting portion.

10 Claims, 14 Drawing Sheets

ELECTRONIC APPARATUS

CROSS-REFERENCE TO RELATED APPLICATIONS

This application is based upon and claims the benefit of priority from Japanese Patent Application No. 2009-296141, filed Dec. 25, 2009; the entire contents of which are incorporated herein by reference.

FIELD

Embodiments described herein relate generally to an electronic apparatus including a reinforcing member.

BACKGROUND

In some cases, electronic apparatuses, such as notebook PCs, include reinforcing members. Jpn. Pat. Appln. KOKAI Publication No. 2003-87378 discloses an electronic apparatus including a metal base plate. The base plate is a die-cast component. A hinge attached to a display unit is fixed to the base plate.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings. In general, according to one embodiment, an electronic apparatus comprises a main housing, a keyboard attached to the main housing, a hinge attached to a display housing, and a reinforcing member in the main housing. The reinforcing member comprises a fixing portion to which the hinge is attached and a supporting portion comprising a surface facing the keyboard. The keyboard is placed on the supporting portion.

Hereinafter, exemplary embodiments applied to a notebook personal computer (hereinafter, referred to as a notebook PC) will be described with reference to the accompanying drawings.

First Embodiment

FIGS. 1 to 14 show an electronic apparatus 1 according to an embodiment. The electronic apparatus 1 is, for example, a notebook PC. However, electronic apparatuses to which the embodiment can be applied are not limited thereto. The embodiment can be widely applied to various kinds of electronic apparatuses, such as a personal digital assistant (PDA) and a game machine.

Figure 1:
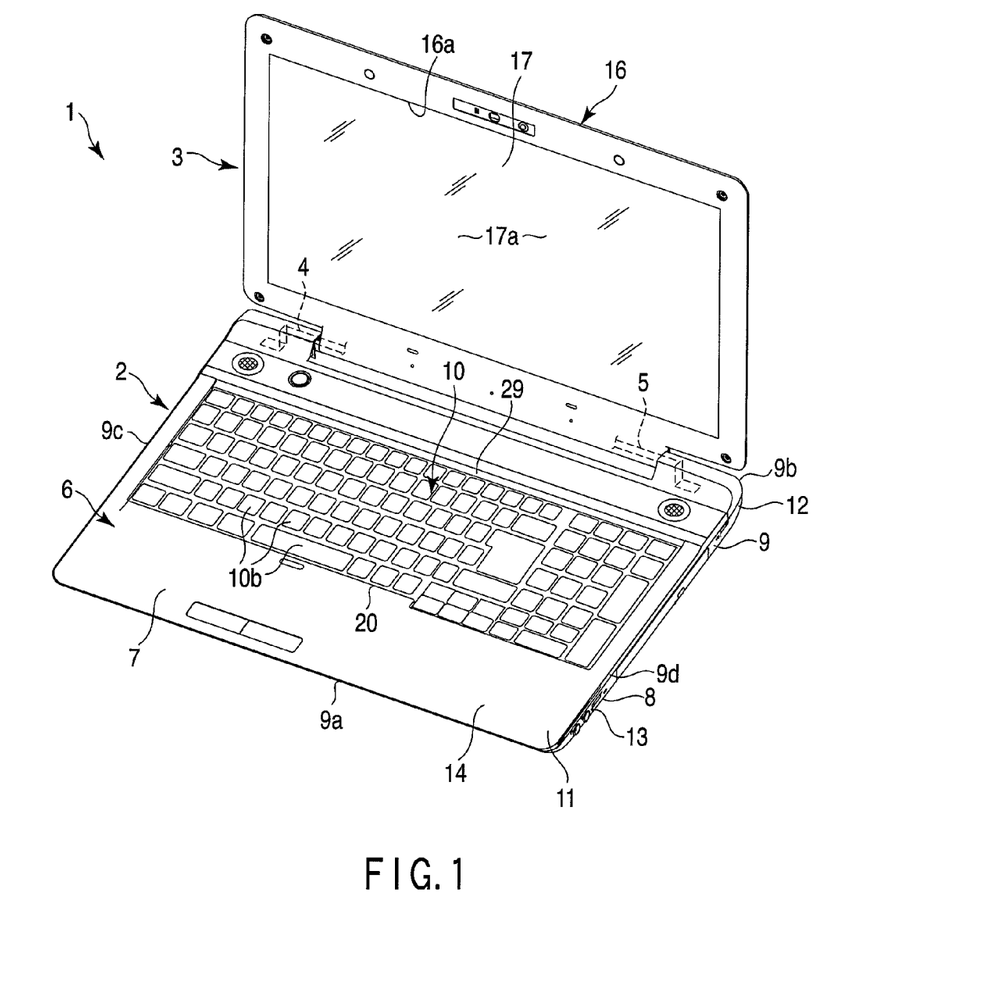
FIG. 1 is an exemplary perspective view illustrating an electronic apparatus according to an embodiment.

As shown in FIG. 1, the electronic apparatus 1 includes a main unit 2, a display unit 3, and first and second hinges 4 and 5. The main unit 2 is an example of a "first unit". The display unit 3 is an example of a "second unit".

The main unit 2 is an electronic apparatus main body provided with a main board. The main unit 2 includes a main housing 6. The main housing 6 is an example of a "first housing". The main housing 6 has a flat box shape including an upper wall 7, a lower wall 8, and a circumferential wall 9.

The lower wall 8 faces a desk surface when the electronic apparatus 1 is placed on a desk. The lower wall 8 is substantially parallel to the desk surface. The upper wall 7 is opposite to the lower wall 8 with a space therebetween and extends substantially in parallel (that is, substantially in a horizontal direction) to the lower wall 8. A keyboard 10 is attached to the upper wall 7. The circumferential wall 9 rises with respect to the lower wall 8, and connects a peripheral portion of the lower wall 8 and a peripheral portion of the upper wall 7.

As shown in FIG. 1, the circumferential wall 9 includes a front wall 9a, a rear wall 9b, a left wall 9c, and a right wall 9d. The front wall 9a extends in the left-right direction in a front end portion 11 of the main housing 6, and faces the user of the electronic apparatus 1. The rear wall 9b extends substantially in parallel to the front wall 9a in the left-right direction in a rear end portion 12 of the main housing 6.

Each of the left wall 9c and the right wall 9d extends in the front-rear direction (depth direction) of the main housing 6. The left wall 9c connects a left end portion of the front wall 9a and a left end portion of the rear wall 9b. The right wall 9d connects a right end portion of the front wall 9a and a right end portion of the rear wall 9b. In the specification, the side closer to the user is defined as the front side and the side away from the user is defined as the rear side. In addition, the left and right sides are defined in the user's viewing direction.

The main housing 6 includes a main base 13 and a main cover 14. The main base 13 includes the lower wall 8 and a part of the circumferential wall 9. The main cover 14 includes the upper wall 7 and a part of the circumferential wall 9. The main cover 14 is combined with the main base 13 to form the main housing 6.

As shown in FIG. 1, the display unit 3 includes a display housing 16 and a display device 17 in the display housing 16. The display housing 16 is an example of a "second housing". The display housing 16 includes a relatively large opening portion 16a through which a display screen 17a of the display device 17 is exposed to the outside.

The first and second hinges 4 and 5 are attached to the display housing 16. As described above, the main housing 6 includes the rear end portion 12, which is a first end portion, and the front end portion 11, which is a second end portion. The display unit 3 is rotatably (openably) attached to the rear end portion 12 by, for example, the first and second hinges 4 and 5. The display unit 3 can be pivoted between a closed position where the display unit 3 falls and covers the main unit 2 from above and an opened position where the display unit 3 rises with respect to the main unit 2.

Figure 2:
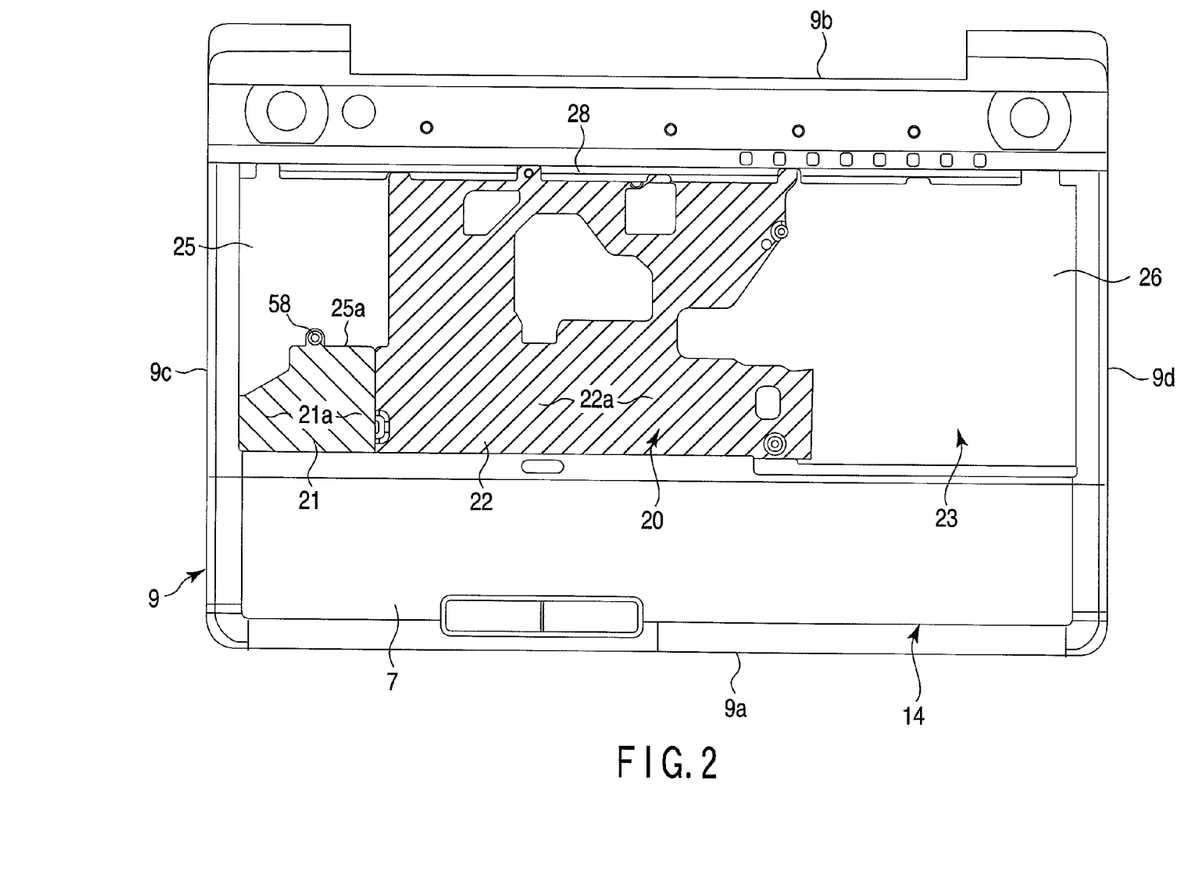
FIG. 2 is an exemplary plan view illustrating a main cover of the electronic apparatus shown in FIG. 1.

FIG. 2 is a diagram illustrating the main cover 14. As shown in FIG. 2, the upper wall 7 of the main housing 6 includes a keyboard mounting portion 20. The keyboard mounting portion 20 includes a supporting wall 21, a supporting frame 22, and an opening portion 23. In FIG. 2, for convenience of illustration, the supporting wall 21 and the supporting frame 22 are hatched.

Figure 7:
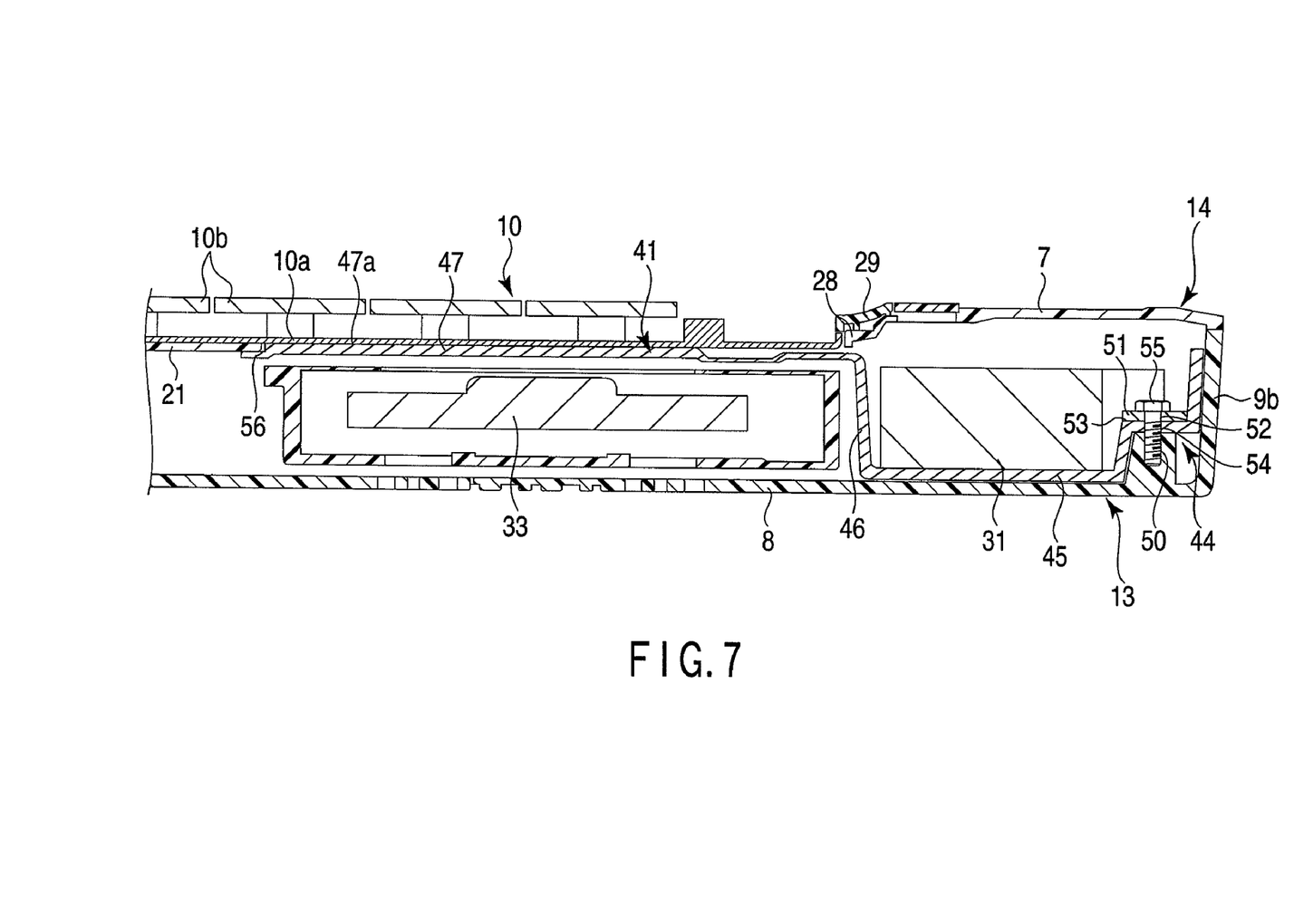
FIG. 7 is an exemplary cross-sectional view illustrating the first die-cast frame taken along the line F7-F7 of FIG. 4.

For example, the supporting wall 21 is at the left corner of the front end portion of the keyboard mounting portion 20. For example, the supporting wall 21 is formed integrally with the upper wall 7 and is made of a synthetic resin. The supporting wall 21 is connected to the upper wall 7 and is recessed from the upper wall 7. As shown in FIG. 7, the keyboard 10 is partially placed on the supporting wall 21. The supporting wall 21 extends substantially horizontally below the keyboard 10. The supporting wall 21 includes a surface 21a (e.g., upper surface) that extends in the plane and faces the keyboard 10.

The opening portion 23 is substantially in the entire region of the keyboard mounting portion 20 except for the supporting wall 21. The opening portion 23 is formed in the main housing 6. The supporting frame 22 is provided in the opening portion 23. The supporting frame 22 is a metal plate member formed separately from the main housing 6 and is made of, for example, aluminum. The supporting frame 22 is fixed to the inner surface of the upper wall 7 and is substantially at the same height as the supporting wall 21.

Figure 8:
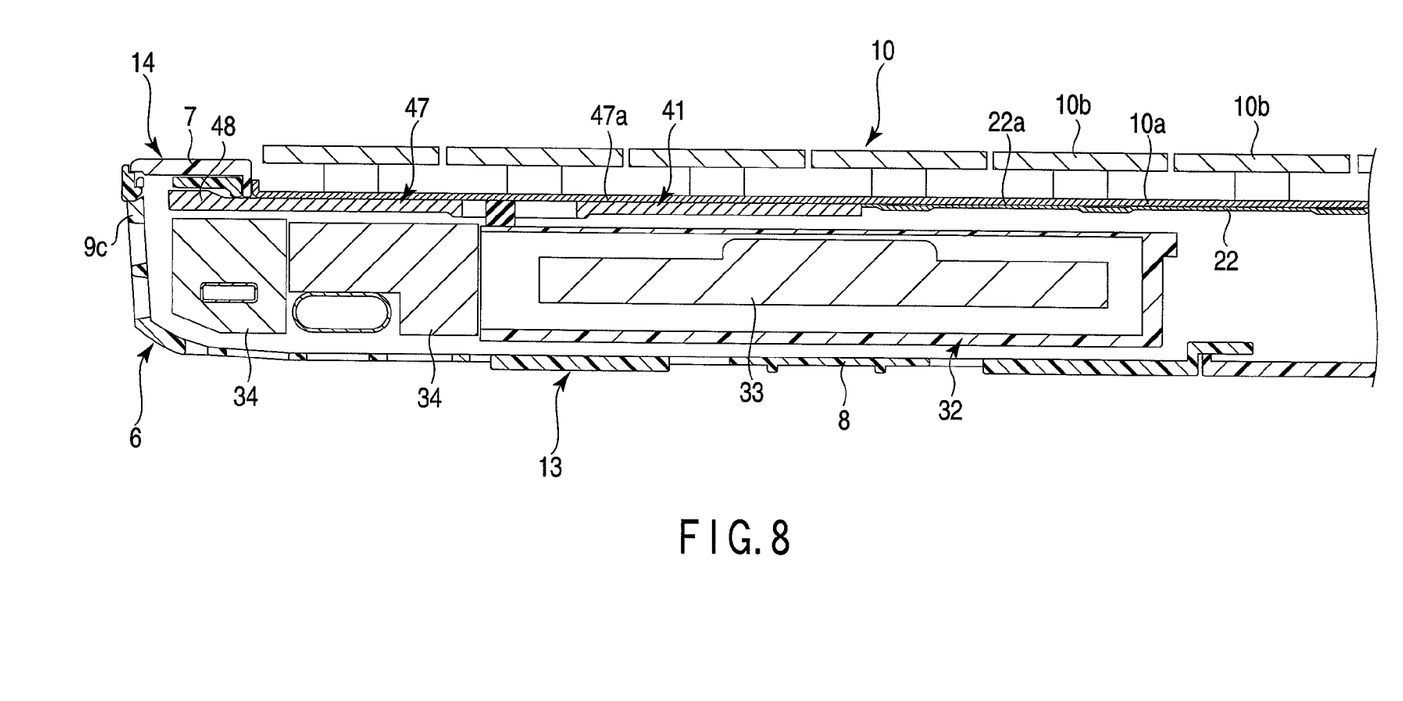
FIG. 8 is an exemplary cross-sectional view illustrating the first die-cast frame taken along the line F8-F8 of FIG. 4.

As shown in FIG. 8, the keyboard 10 is partially placed on the supporting frame 22. The supporting frame 22 extends substantially horizontally below the keyboard 10. The supporting frame 22 includes a surface 22a (e.g., upper surface) that extends in the plane and faces the keyboard 10. The surface 22a of the supporting frame 22 is substantially on the same plane as the surface 21a of the supporting wall 21.

As shown in FIG. 2, the supporting frame 22 extends over the entire width of the opening portion 23 in the lateral direction, that is, the entire width of the keyboard mounting portion 20 in the lateral direction. The supporting frame 22 is substantially at the center of the opening portion 23 in the longitudinal direction of the keyboard mounting portion 20. In this way, the opening portion 23 includes a first opening portion 25 formed between the left edge portion of the opening portion 23 and the supporting frame 22, and a second opening portion 26 formed between the right edge portion of the opening portion 23 and the supporting frame 22. The first and second opening portions 25 and 26 face the lower surface of the keyboard 10.

Figure 12:
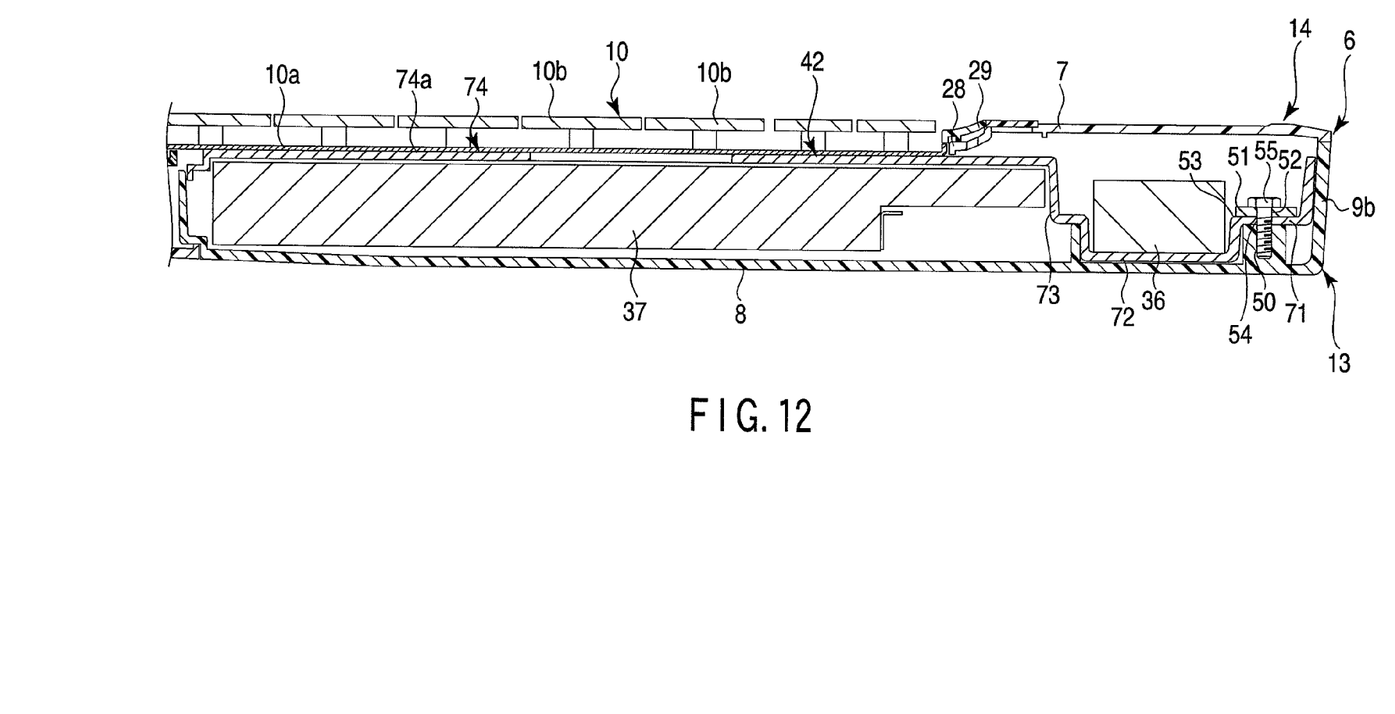
FIG. 12 is an exemplary cross-sectional view illustrating the second die-cast frame taken along the line F12-F12 of FIG. 9.

As shown in FIGS. 2, 7, and 12, a keyboard holder mounting portion 28 is provided on the rear side of the keyboard mounting portion 20. The keyboard holder mounting portion 28 protrudes from the keyboard mounting portion 20. The keyboard 10 is fixed by a keyboard holder 29 attached to the keyboard holder mounting portion 28.

Figure 3:
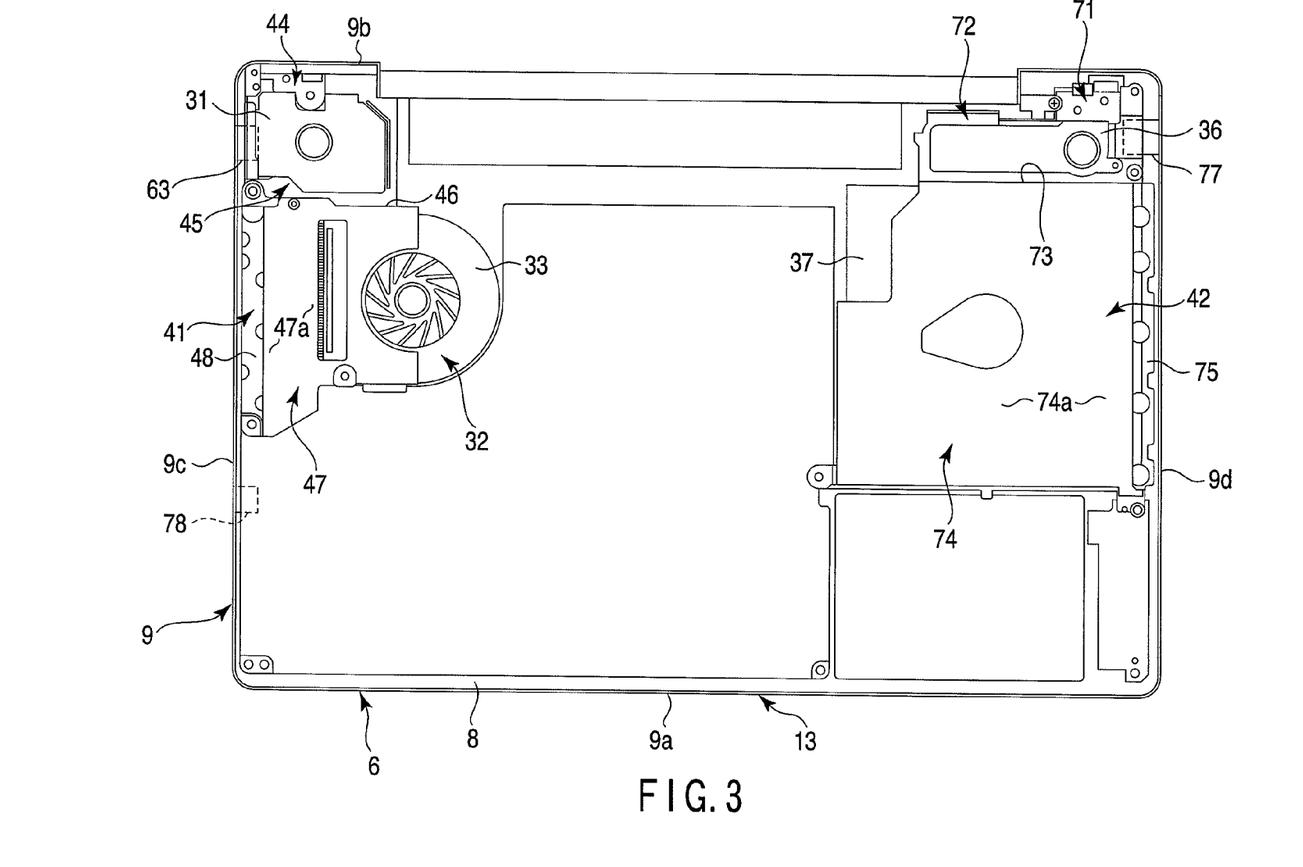
FIG. 3 is an exemplary plan view illustrating the inside of a main housing of the electronic apparatus shown in FIG. 1.

As shown in FIG. 3, a first speaker 31 and a cooling device 32 are in the left end portion of the main housing 6. The first speaker 31 is in the rear end portion 12 of the main housing 6. The cooling device 32 is on the front side of the first speaker 31 and below the keyboard 10.

For example, the cooling device 32 includes a cooling fan 33 and two heat sinks 34. The cooling fan 33 discharges cooling air to the heat sinks 34. Each of the heat sinks 34 is, for example, a fin unit including a plurality of fins. The two heat sinks 34 and the cooling fan 33 are arranged in the substantially horizontal direction. Only one heat sink 34 may be provided. The cooling device 32 may not include the cooling fan 33 and may include just a heat sink 34.

As shown in FIG. 3, a second speaker 36 and an optical disk drive (ODD) unit 37 are in the right end portion of the main housing 6. The second speaker 36 is in the rear end portion 12 of the main housing 6. The ODD unit 37 is on the front side of the second speaker 36 and below the keyboard 10.

As shown in FIG. 3, first and second die-cast frames 41 and 42 are in the main housing 6. Each of the first and second die-cast frames 41 and 42 is an example of a "reinforcing member". The first and second die-cast frames 41 and 42 are, for example, die-cast molding made of a magnesium alloy, but are not limited thereto.

Figure 5:
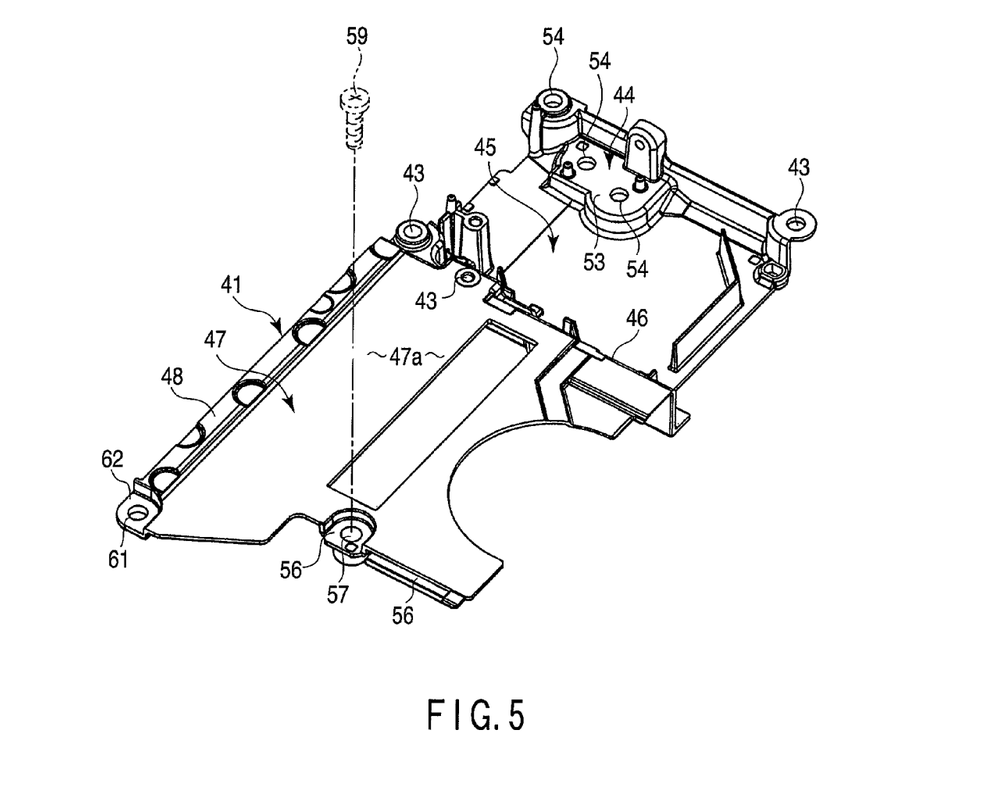
FIG. 5 is an exemplary perspective view illustrating the first die-cast frame shown in FIG. 4.

FIG. 5 is a diagram illustrating the overall structure of the first die-cast frame 41. The first die-cast frame 41 is in the left end portion of the main housing 6. For example, the first die-cast frame 41 includes a plurality of through holes 43 into which screws are inserted and is fixed to the main housing 6 with screws. The first die-cast frame 41 includes a hinge fixing portion 44, a speaker holder 45, a rising portion 46, a supporting portion 47, and a reinforcing portion 48. The hinge fixing portion 44 is an example of a "fixing portion".

Figure 4:
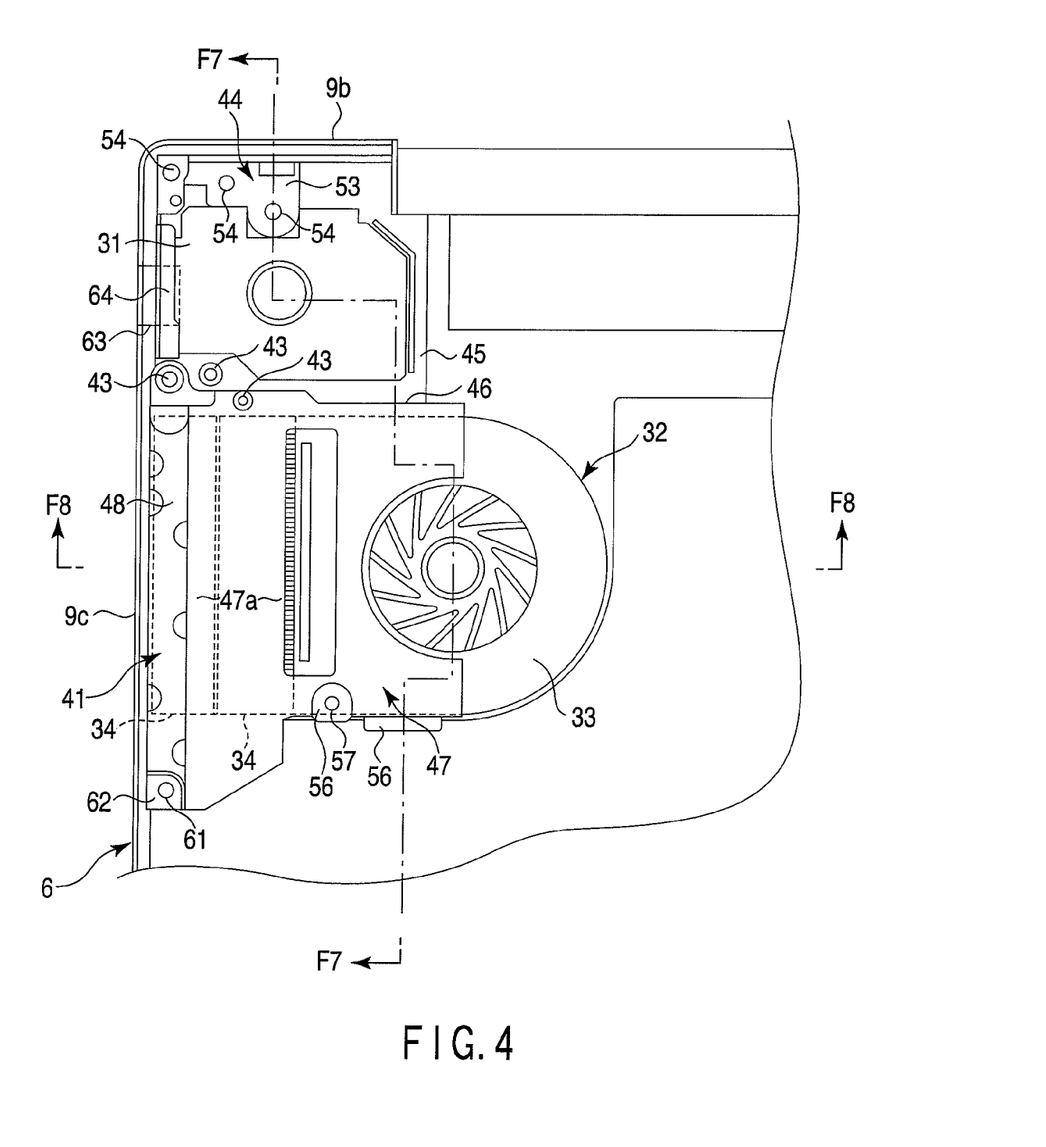
FIG. 4 is an exemplary plan view illustrating a first die-cast frame shown in FIG. 3.
Figure 6:
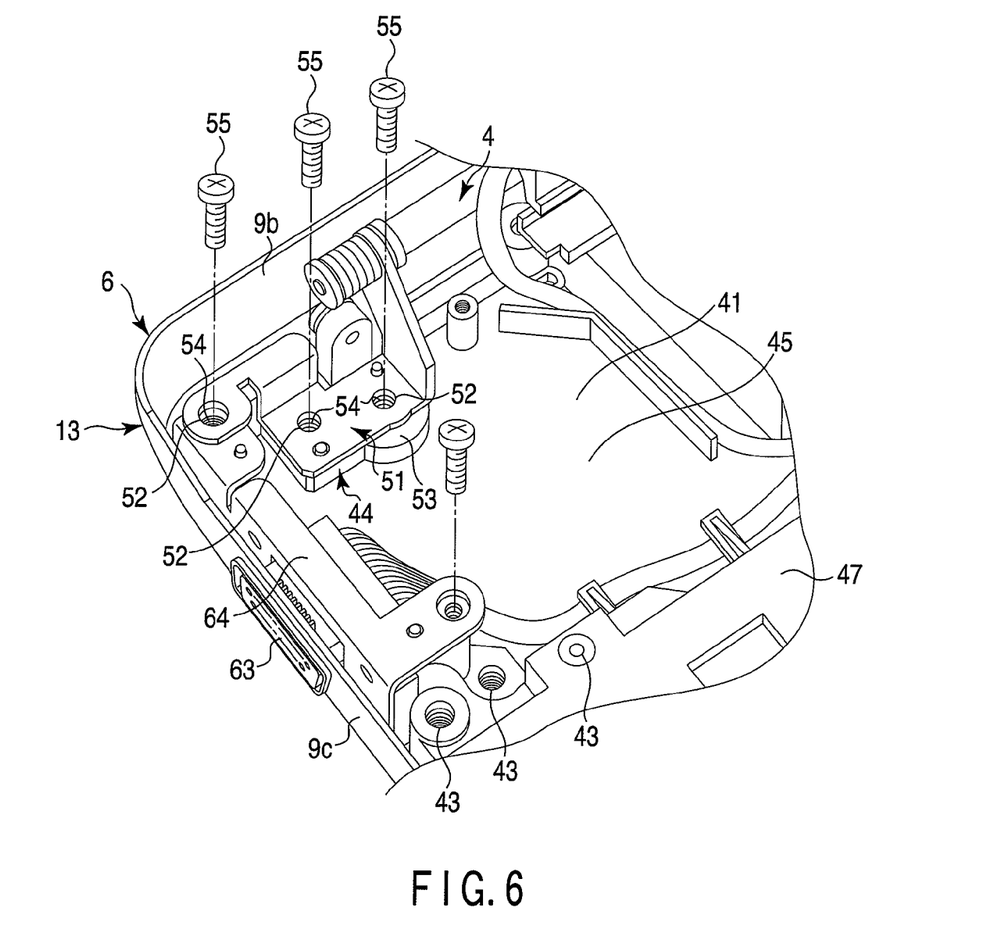
FIG. 6 is an exemplary perspective view illustrating a hinge fixing portion shown in FIG. 4.

As shown in FIGS. 4, 6, and 7, the hinge fixing portion 44 is in the rear end portion 12 of the main housing 6. The first hinge 4 includes a hinge metal plate 51 serving as a fixing portion and through holes 52 provided in the hinge metal plate 51. The hinge fixing portion 44 includes an attachment surface 53 on which the hinge metal plate 51 is placed and through holes 54 provided in the attachment surface 53. For example, the through hole 54 communicates with a screw hole 50 in the main base 13.

The first hinge 4 is fixed to the first die-cast frame 41 by placing the hinge metal plate 51 on the attachment surface 53 and inserting screws 55 into the screw holes of the main base 13 through the through holes 52 and the through holes 54. At the same time, the first hinge 4 and the first die-cast frame 41 are fixed to the main base 13. Alternatively, the first hinge 4 may be fixed to the first die-cast frame 41 by inserting the screws into screw holes provided in the first die-cast frame 41.

The speaker holder 45 is adjacent to the hinge fixing portion 44. The speaker holder 45 has a plate shape on which the first speaker 31 can be placed and extends along the lower wall 8 of the main housing 6. The speaker holder 45 is larger than the first speaker 31 and the first speaker 31 is attached to the speaker holder 45.

The width of the speaker holder 45 in the longitudinal direction of the keyboard 10 is substantially equal to that of the hinge fixing portion 44 in the longitudinal direction of the keyboard 10. The speaker holder 45 having the above-mentioned width connects the hinge fixing portion 44 and the supporting portion 47 in a plate shape.

As shown in FIG. 7, the rising portion 46 is between the supporting portion 47 and the speaker holder 45. The rising portion 46 extends upward from the front end portion of the speaker holder 45. The supporting portion 47 extends substantially horizontally from the upper end portion of the rising portion 46 in a direction opposite to the speaker holder 45. In this way, the supporting portion 47 is at a position higher than the speaker holder 45 and immediately below the keyboard 10. In addition, the thickness and rigidity of the supporting portion 47 are more than those of the supporting wall 21 and the supporting frame 22.

Figure 14:
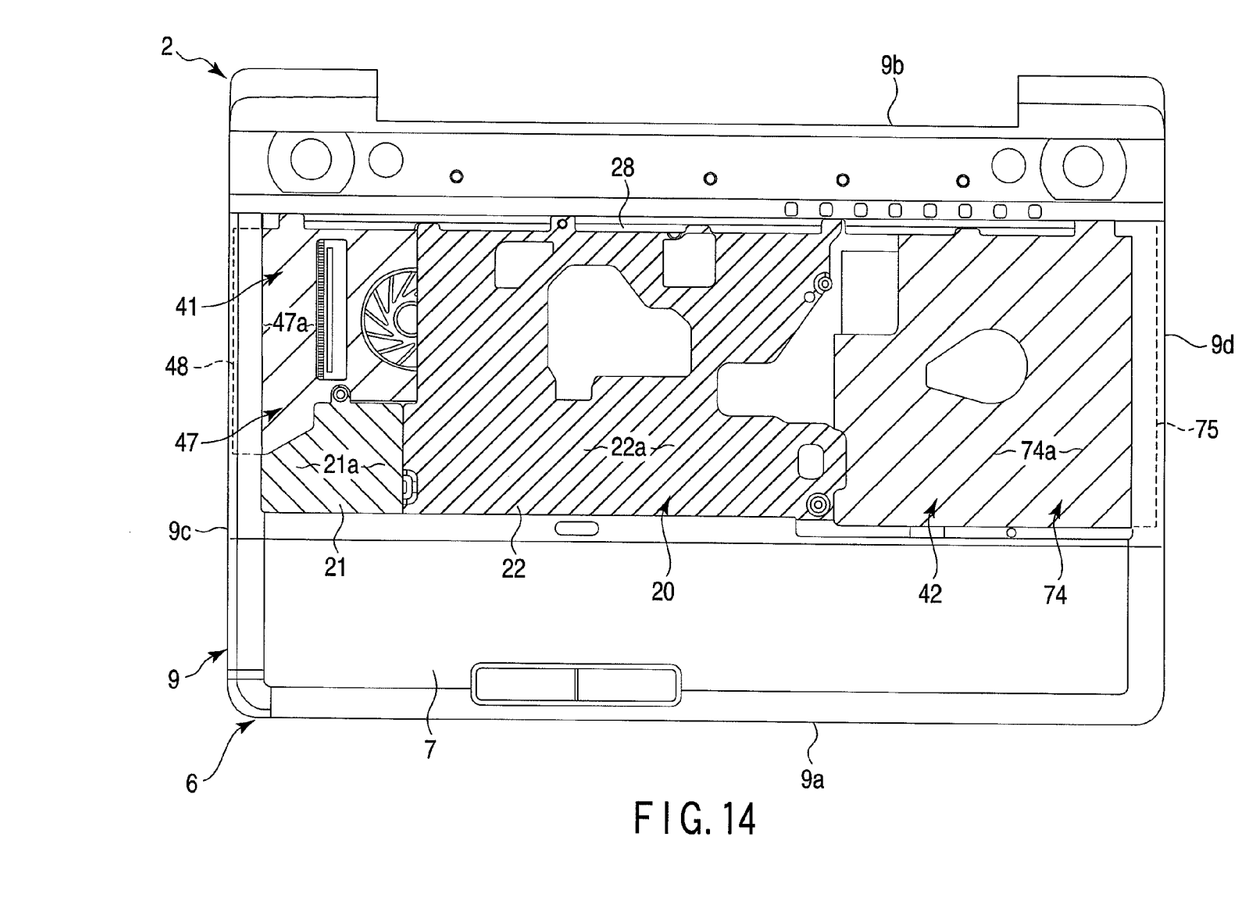
FIG. 14 is an exemplary plan view illustrating the assembly of the first and second die-cast frames to the main cover shown in FIG. 2.

As shown in FIGS. 7, 8, and 14, the supporting portion 47 is in the first opening portion 25 and substantially at the same height as the supporting wall 21 and the supporting frame 22. The keyboard 10 is partially placed on the supporting portion 47. The supporting portion 47 extends substantially horizontally below the keyboard 10. The supporting portion 47 includes a surface that extends in the plane and faces the keyboard 10. That is, a surface 47a (e.g., upper surface) of the supporting portion 47 faces and comes into contact with the keyboard 10.

The surface 47a of the supporting portion 47 is substantially in the same plane as the surface 21a of the supporting wall 21 and the surface 22a of the supporting frame 22. That is, the supporting portion 47 is exposed to a surface on which the keyboard 10 is placed and supports the keyboard 10.

Specifically, the keyboard 10 includes a keyboard substrate 10a and a plurality of keys 10b on the keyboard substrate 10a. The keyboard substrate 10a includes a substantially flat bottom. The flat bottom of the keyboard substrate 10a is placed so as to come into close contact with the surface 47a of the supporting portion 47, the surface 21a of the supporting wall 21, and the surface 22a of the supporting frame 22.

As shown in FIG. 14, at least a portion of the peripheral portion of the supporting portion 47 has a shape along an edge portion 25a (opening edge portion) of the first opening portion 25, that is, the rear end portion of the supporting wall 21. For example, the supporting portion 47 according to this embodiment has substantially the same shape as the first opening portion 25 and is fitted to substantially the entire region of the first opening portion 25.

As shown in FIGS. 7, 8, and 14, specifically, the supporting portion 47 has a shape along the rear end portion of the supporting wall 21 and there is substantially no gap between the supporting portion 47 and the supporting wall 21. The supporting portion 47 has a shape along the left end portion of the supporting frame 22 and there is substantially no gap between the supporting portion 47 and the supporting frame 22. The surface 47a of the supporting portion 47 is continued to the surface 21a of the supporting wall 21 and the surface 22a of the supporting frame 22 in the plane. In FIG. 14, for convenience of illustration, the first and second die-cast frames 41 and 42, the supporting wall 21, and the supporting frame 22 are hatched.

As shown in FIG. 5, the first die-cast frame 41 includes a wall supporting portion 56 that protrudes from the tip end portion (front end portion) of the supporting portion 47 to the lower side of the supporting wall 21. As shown in FIG. 7, the end portion of the supporting wall 21 is placed on the wall supporting portion 56. That is, the wall supporting portion 56 supports the end portion of the supporting wall 21 from below.

As shown in FIG. 5, the wall supporting portion 56 includes a screw hole 57. As shown in FIG. 2, the end portion of the supporting wall 21 includes a through hole 58 that communicates with the screw hole 57. A screw 59 is inserted into the screw hole 57 through the through hole 58 to fix the end portion of the supporting wall 21 to the wall supporting portion 56. The through hole 58 includes a counterbore that receives the head of the screw 59. In this way, the head of the screw 59 does not protrude from the surface 21a of the supporting wall 21. The screw 59 is covered by the keyboard 10 placed on the supporting wall 21.

As shown in FIG. 8, the cooling device 32 (that is, the cooling fan 33 and the heat sinks 34) faces the lower wall 8 of the main housing 6. The supporting portion 47 extends in a plate shape between the keyboard 10 and the cooling device 32. The supporting portion 47 covers the upper side of the cooling device 32 and protects the cooling device 32.

As shown in FIG. 5, the reinforcing portion 48 is along the left end portion of the supporting portion 47. For example, the reinforcing portion 48 is thicker than the supporting portion 47 and functions as a beam portion. As shown in FIG. 8, the reinforcing portion 48 deviates from the lower side of the keyboard 10. The reinforcing portion 48 is between the left end portion of the keyboard mounting portion 20 and the left wall 9c of the main housing 6 and faces the upper wall 7.

As shown in FIG. 5, a fixing portion 62 including a through hole 61 is provided in the tip end portion of the reinforcing portion 48. The fixing portion 62 is between a boss on the main base 13 and the screw hole in the main cover 14. A screw is inserted into the screw hole of the main cover 14 from the main base side to fix the fixing portion 62 to the main housing 6.

As shown in FIGS. 4 and 6, a first connector 63 is in the main housing 6. The first connector 63 is in the opening portion of the left wall 9c of the main housing 6. The first connector 63 is held by a metal plate member 64 attached to the first connector 63. The metal plate member 64 is fixed to the first die-cast frame 41. The metal plate member 64 is an example of an "attachment member".

Figure 10:
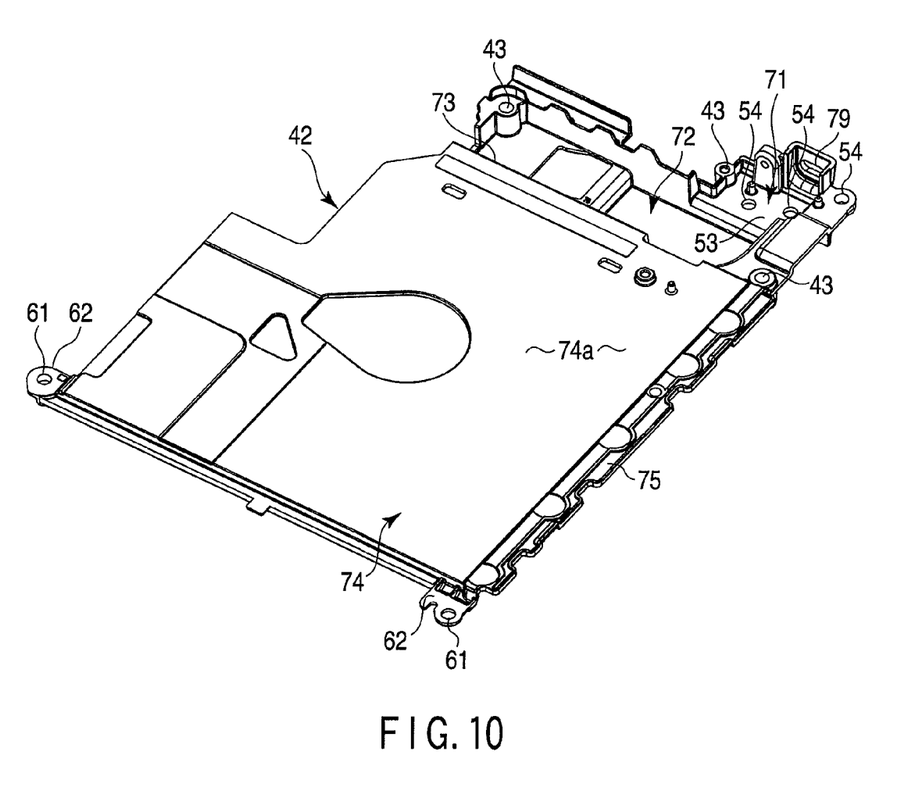
FIG. 10 is an exemplary perspective view illustrating the second die-cast frame shown in FIG. 9.

FIG. 10 is a diagram illustrating the overall structure of the second die-cast frame 42. The second die-cast frame 42 is in the right end portion of the main housing 6. Portions having the same functions as those of the first die-cast frame 41 and the first hinge 4 are denoted by the same reference numerals and a description thereof will be omitted. For example, the second die-cast frame 42 includes a plurality of through holes 43 into which screws are inserted and is fixed to the main housing 6 with screws.

The second die-cast frame 42 includes a hinge fixing portion 71, a speaker holder 72, a rising portion 73, a supporting portion 74, and a reinforcing portion 75. The hinge fixing portion 71 is an example of a "fixing portion".

Figure 9:
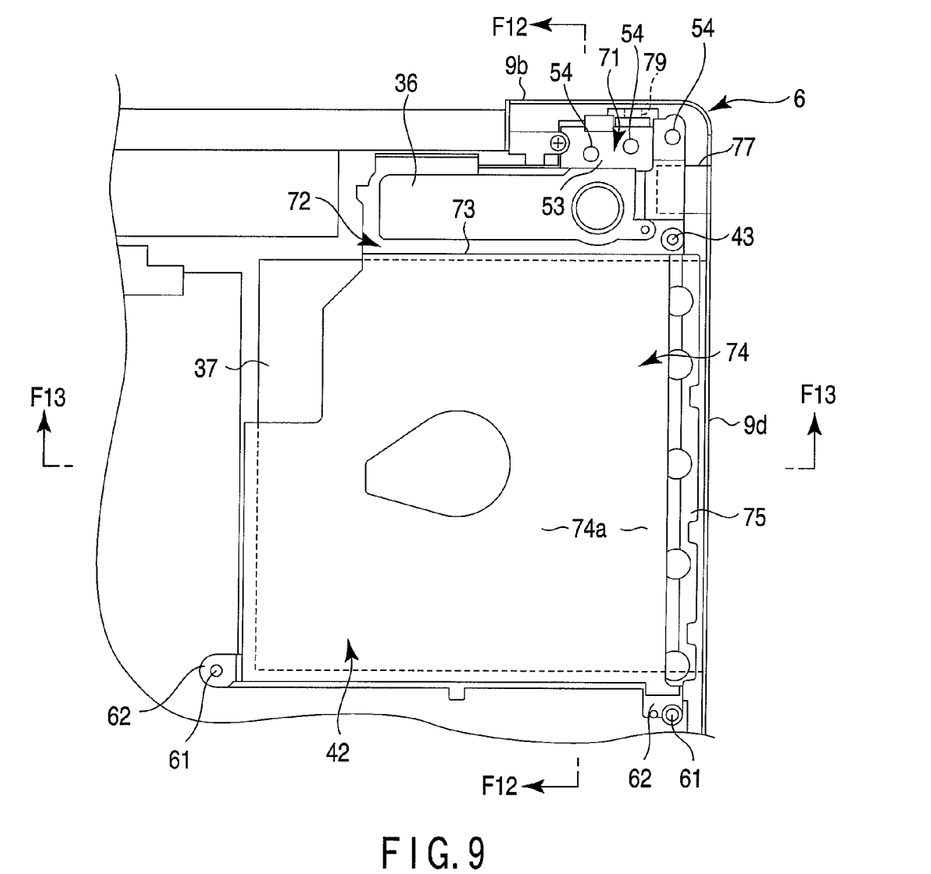
FIG. 9 is an exemplary plan view illustrating a second die-cast frame shown in FIG. 3.
Figure 11:
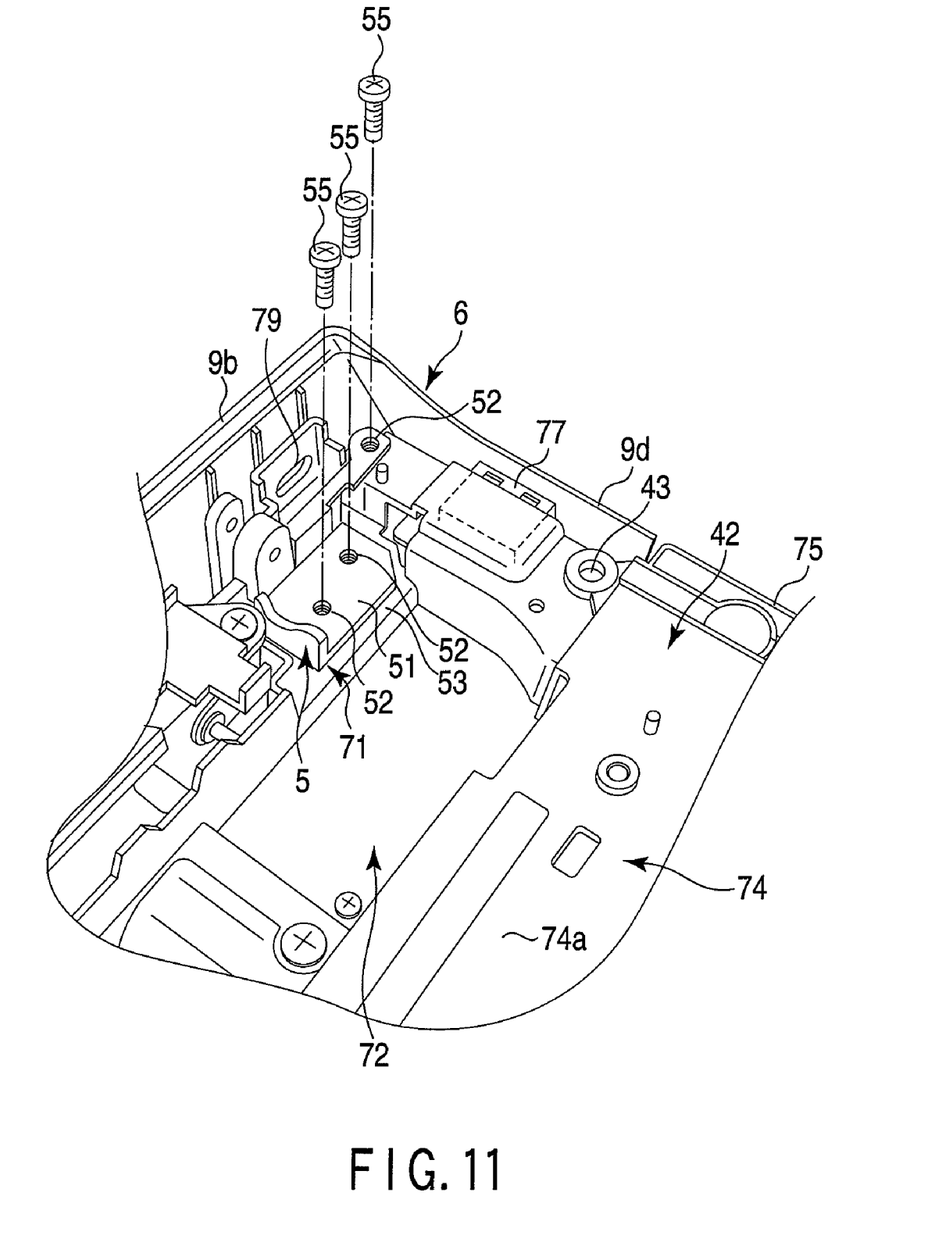
FIG. 11 is an exemplary perspective view illustrating the hinge fixing portion shown in FIG. 9.

As shown in FIGS. 9, 11, and 12, the hinge fixing portion 71 is in the rear end portion 12 of the main housing 6. The hinge fixing portion 71 includes an attachment surface 53 on which the hinge metal plate 51 is placed and through holes 54 provided in the attachment surface 53. Similar to the first hinge 4, the second hinge 5 is fixed to the hinge fixing portion 71.

The speaker holder 72 is adjacent to the hinge fixing portion 71. The speaker holder 72 has a plate shape on which the second speaker 36 can be placed and extends along the lower wall 8 of the main housing 6. The speaker holder 72 is larger than the second speaker 36 and the second speaker 36 is attached to the speaker holder 72.

The width of the speaker holder 72 in the longitudinal direction of the keyboard 10 is larger than that of the hinge fixing portion 71 in the longitudinal direction of the keyboard 10. The speaker holder 72 having the above-mentioned width connects the hinge fixing portion 71 and the supporting portion 74 in a plate shape.

As shown in FIG. 12, the rising portion 73 is between the supporting portion 74 and the speaker holder 72. The rising portion 73 extends upward from the front end portion of the speaker holder 72. The supporting portion 74 extends substantially horizontally from the upper end portion of the rising portion 73 in a direction opposite to the speaker holder 72. In this way, the supporting portion 74 is at a position higher than the speaker holder 72 and immediately below the keyboard 10.

Figure 13:
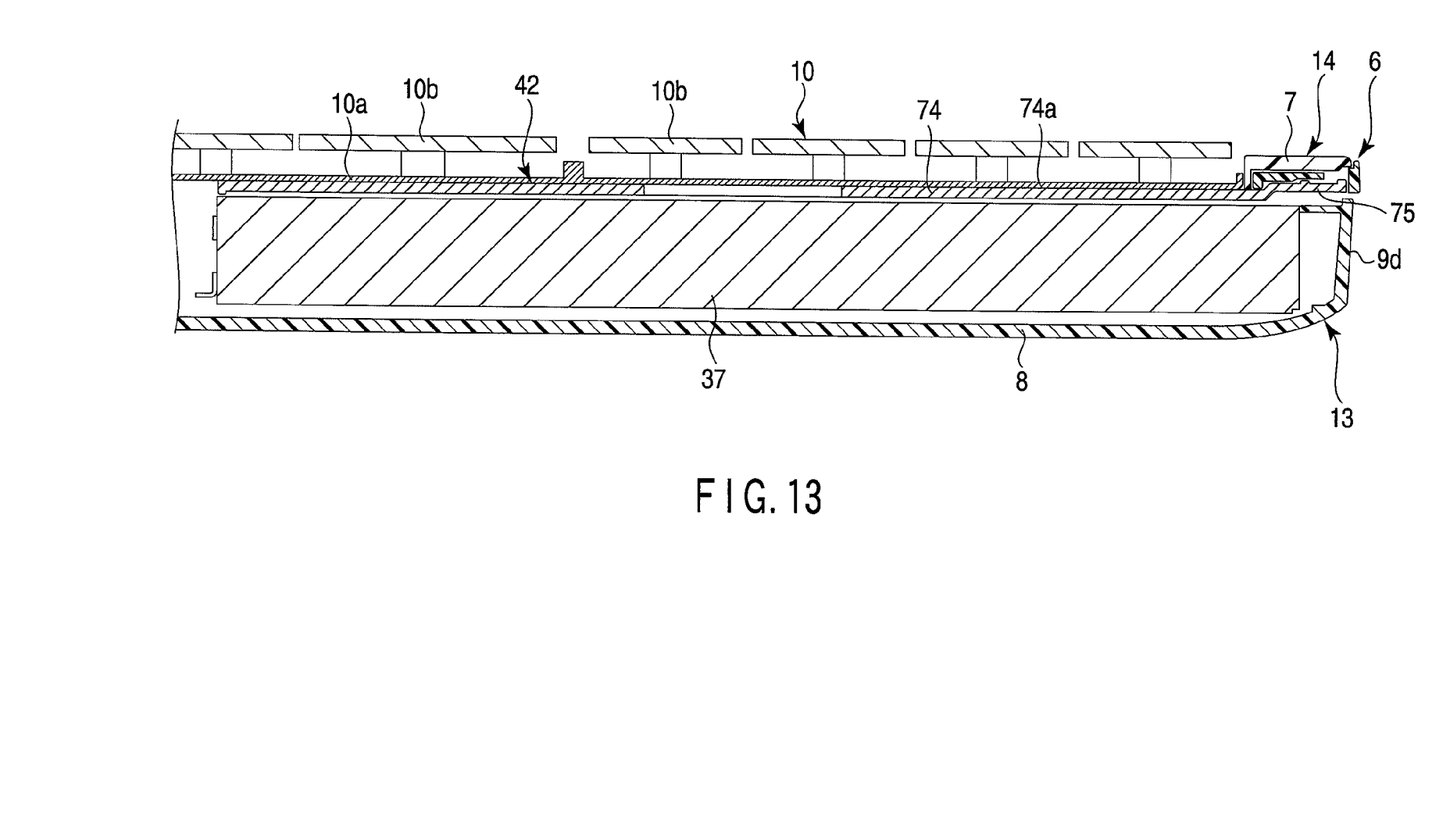
FIG. 13 is an exemplary cross-sectional view illustrating the second die-cast frame taken along the line F13-F13 of FIG. 9.

As shown in FIGS. 12, 13, and 14, the supporting portion 74 is provided in the second opening portion 26 and substantially at the same height as the supporting frame 22. The keyboard 10 is partially placed on the supporting portion 74. The supporting portion 74 extends substantially horizontally below the keyboard 10. The supporting portion 74 includes a surface that extends in the plane and faces the keyboard 10. That is, a surface 74a (e.g., upper surface) of the supporting portion 74 faces and comes into contact with the keyboard 10.

The surface 74a of the supporting portion 74 is substantially in the same plane as the surface 22a of the supporting frame 22. That is, the supporting portion 74 is exposed to the surface on which the keyboard 10 is placed and supports the keyboard 10. The substantially flat bottom of the keyboard substrate 10a is placed so as to come into close contact with the surface 74a of the supporting portion 74. In addition, the thickness and rigidity of the supporting portion 74 are more than those of the supporting frame 22. The supporting wall 21 extends over the entire width of the second opening portion 26 in the lateral direction of the keyboard 10.

As shown in FIG. 12, the ODD unit 37 faces the lower wall 8 of the main housing 6. The supporting portion 74 extends in a plate shape between the keyboard 10 and the ODD unit 37. The supporting portion 74 covers the upper side of the ODD unit 37 and protects the ODD unit 37.

As shown in FIG. 10, the reinforcing portion 75 is along the right end portion of the supporting portion 74. For example, the reinforcing portion 75 is thicker than the supporting portion 74 and functions as a beam portion. As shown in FIG. 13, the reinforcing portion 75 deviates from the lower side of the keyboard 10. The reinforcing portion 75 is between the right end portion of the keyboard mounting portion 20 and the right wall 9d of the main housing 6 and faces the upper wall 7.

As shown in FIG. 10, the fixing portion 62 including the through hole 61 is in the tip end portion of the reinforcing portion 75. The fixing portion 62 is between a boss provided on the main base 13 and the screw hole provided in the main cover 14. A screw is inserted into the screw hole of the main cover 14 from the main base side to fix the fixing portion 62 to the main housing 6.

As shown in FIGS. 9 and 11, a second connector 77 is in the main housing 6. The second connector 77 is in an opening portion of the right wall 9d of the main housing 6. The second connector 77 is directly fixed to the second die-cast frame 42.

As shown in FIG. 3, a third connector 78 is in a region that deviates from the first and second die-cast frames 41 and 42. The third connector 78 is fixed to the main housing 6 made of a synthetic resin. The first and second connectors 63 and 77 are larger than the third connector 78, and the load applied to the first and second connectors 63 and 77 when a plug (i.e., terminal) is inserted or removed is more than that applied to the third connector 78.

As shown in FIG. 10, an antitheft lock hole 79 is in the second die-cast frame 42. For example, the lock hole 79 is used in the Kensington lock.

According to the above-mentioned structure, it is possible to improve the strength of the electronic apparatus 1 while reducing the thickness thereof. That is, in the above-mentioned structure, the die-cast frames 41 and 42 to which the hinges 4 and 5 are fixed extend up to the lower side of the keyboard 10, and the supporting portions 47 and 74 supporting the keyboard 10 are provided. Therefore, it is possible to support the keyboard 10 with the high-rigidity die-cast frames 41 and 42, as compared to the structure in which a metal plate, such as the supporting frame 22, covers the entire lower portion of the keyboard 10. Therefore, it is possible to improve the strength of the electronic apparatus 1.

The supporting portions 47 and 74 include the surfaces 47a and 74a facing the keyboard 10, are exposed to the surface on which the keyboard 10 is placed, and come into direct contact with the keyboard 10. According to this structure, it is possible to reduce the thickness of the electronic apparatus 1, as compared to an electronic apparatus in which the supporting wall is below the keyboard 10 and the reinforcing member is below the supporting wall.

The main housing 6 includes the opening portions 25 and 26 facing the keyboard 10, the supporting portions 47 and 74 are in the opening portions 25 and 26, and the surfaces 47a and 74a of the supporting portions 47 and 74 are substantially in the same plane as the surface 21a of the supporting wall 21. In this case, a supporting surface (i.e., mounting surface) that supports the keyboard 10 is substantially flat and the keyboard 10 is stably supported.

For example, in the structure in which a metal plate member, such as the supporting frame 22, covers the entire portion below the keyboard 10, when the pressing force of the user against the keyboard 10 is strong, the supporting frame 22 is likely to be bent and a load is likely to be applied to the cooling device 32 or the ODD unit 37 below the keyboard 10, which may cause defects in the cooling device 32 or the ODD unit 37.

However, in this embodiment, the die-cast frames 41 and 42 are above the cooling device 32 and the ODD unit 37. Even though the pressing force of the user against the keyboard 10 is a strong, the die-cast frames 41 and 42 are hardly bent, and a load is less likely to be applied to the cooling device 32 or the ODD unit 37. That is, the die-cast frames 41 and 42 protect the cooling device 32 and the ODD unit 37.

When the speaker holders 45 and 72 are formed in a plate shape and connect the hinge fixing portions 44 and 71 and the supporting portions 47 and 74, the hinge fixing portions 44 and 71 and the supporting portions 47 and 74 are strongly connected to each other. Therefore, substantially the entire die-cast frames 41 and 42 can disperse and receive external force applied to the supporting portions 47 and 74. In this way, the strength of the electronic apparatus 1 is further improved.

When the metal plate member 64 attached to the connector 77 or the connector 63 is fixed to the die-cast frames 41 and 42, the connectors 63 and 77 are strongly held in the main housing 6. In particular, a relatively small third connector 78 is in the front region of the main housing 6 in which the die-cast frames 41 and 42 do not exist, the first and second connectors 63 and 77 to which a load more than that applied to the third connector 78 is likely to be applied are provided in the rear region of the main housing 6, and the first and second connectors 63 and 77 are fixed to the die-cast frames 41 and 42. In this way, the strength of the electronic apparatus 1 is further improved.

When the antitheft lock hole 79 to which a relatively large load is likely to be applied is provided in the die-cast frame 42, the die-cast frame 42 can receive the load. This contributes to improving the strength of the electronic apparatus 1.

When at least a portion of the peripheral portion of the supporting portion 47 has a shape along the edge portion 25a of the opening portion 25, it is possible to reduce the gap between the supporting wall 21 and the edge portion 25a of the opening portion 25. This contributes to improving the strength of the electronic apparatus 1.

When the die-cast frame 41 includes the wall supporting portion 56 that extends to the lower side of the supporting wall 21, the end portion of the supporting wall 21 is supported by the wall supporting portion 56. In this way, the bending of the supporting wall 21 made of a synthetic resin and having relatively low rigidity is suppressed, and the keyboard 10 is more stably supported. When the end portion of the supporting wall 21 is screwed to the wall supporting portion 56, the bending of the supporting wall 21 is further suppressed.

The electronic apparatus 1 according to the embodiment has been described above, but the embodiment is not limited thereto. The invention is not limited to the above-described embodiment, but the components of the embodiment can be changed without departing from the scope and spirit of the invention.

For example, the supporting frame 22 may be omitted, and the size of the supporting wall 21 may be increased. That is, the supporting wall 21 formed integrally with the upper wall 7 may support substantially the center of the keyboard mounting portion 20. In addition, the supporting wall 21 and the supporting frame 22 may be omitted and the supporting portions 47 and 74 of the die-cast frames 41 and 42 may be in a portion of or the entire keyboard mounting portion 20.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a first housing comprising an opening, a first wall, and a second wall, the second wall configured to face an outer placement surface;
   a keyboard on the first wall;
   a hinge attached to a second housing; and
   a reinforcing member in the first housing, comprising a fixing portion, a first portion, a second portion, and a rising portion,
   wherein the hinge is attached to the fixing portion, the first portion extends in a thickness direction of the first housing and supports the second portion, the second portion is inserted into the opening from a side opposite to the keyboard and comprises a surface facing the keyboard on a substantially same plane as a surface of the first wall, the keyboard is placed on the second portion, and the rising portion is between the second wall and a vicinity of an edge of the opening.

2. The electronic apparatus of claim 1,
   wherein the reinforcing member comprises a wall supporting portion provided on an end portion of the second portion, the wall supporting portion extending below the first wall and supporting an end portion of the first wall from the side opposite to the keyboard.

3. The electronic apparatus of claim 2,
   wherein the end portion of the first wall is screwed to the wall supporting portion.

4. The electronic apparatus of claim 1,
   wherein the fixing portion is attached to the first housing, the rising portion extends in a plate shape in the first housing, and
   the reinforcing member comprises a third portion extending in a plate shape along an inner surface of the first housing and connecting the fixing portion and the rising portion.

5. The electronic apparatus of claim 1,
   wherein the fixing portion is attached to the second wall.

6. The electronic apparatus of claim 5,
   wherein the reinforcing member comprises a speaker holder between the fixing portion and the rising portion, the speaker holder holding a speaker, extending in a plate shape along the second wall and connecting the fixing portion and the rising portion,
   the rising portion extends in a plate shape in the first housing, and
   the second portion is supported by the fixing portion via the rising portion and the speaker holder.

7. An electronic apparatus comprising:
   a first housing comprising an opening, a supporting wall, and a lower wall;
   a keyboard at least partially covering the supporting wall;
   a hinge attached to a second housing; and
   a reinforcing member in the first housing, comprising a fixing portion, a supporting portion, and a rising portion,
   wherein the hinge is attached to the fixing portion, the supporting portion is inserted into the opening from a side opposite to the keyboard and configured to support the keyboard at a position different from the supporting wall, and the rising portion is between the lower wall and a vicinity of an edge of the opening.

8. The electronic apparatus of claim 7, further comprising:
   a cooling device in the first housing,
   wherein the reinforcing member comprises a portion located between the keyboard and the cooling device, at least a part of the portion is inserted into the opening, and a gap is provided between the reinforcing member and the cooling device.

9. An electronic apparatus comprising:
   a housing comprising an opening, a first wall, and a second wall, the second wall configured to face an outer placement surface;
   a keyboard on the first wall;
   a connection component at least partially in the housing, the connection component configured to be connected to an outer component; and
   a reinforcing member in the housing, comprising a first portion, a second portion, a supporting portion, and a rising portion,
   wherein the first portion is in a shape expanded in a thickness direction of the housing, the second portion is inserted into the opening from a side opposite to the keyboard and comprises a surface facing the keyboard on a substantially same plane as a surface of the first wall, the keyboard is placed on the second portion, the supporting portion supports the connection component, and the rising portion is between the second wall and a vicinity of an edge of the opening.

10. An electronic apparatus comprising:
    a housing comprise an opening, a supporting wall, and a lower wall;
    a keyboard on the supporting wall;
    a connection component at least partially in the housing, the connection component configured to be connected to an outer component; and
    a reinforcing member in the housing, comprising a supporting portion, a first portion, a second portion, and a rising portion,
    wherein the supporting portion supports the connection component, the first portion extends in a thickness direction of the housing, the second portion is inserted into the opening from a side opposite to the keyboard and comprises a surface facing the keyboard on a substantially same plane as a surface of the supporting wall, the keyboard is placed on the second portion, and the rising portion is between the lower wall and a vicinity of an edge of the opening.

* * * * *